Jan. 17, 1950     W. J. JOHNSON     2,494,620
FISH LURE
Filed April 23, 1946
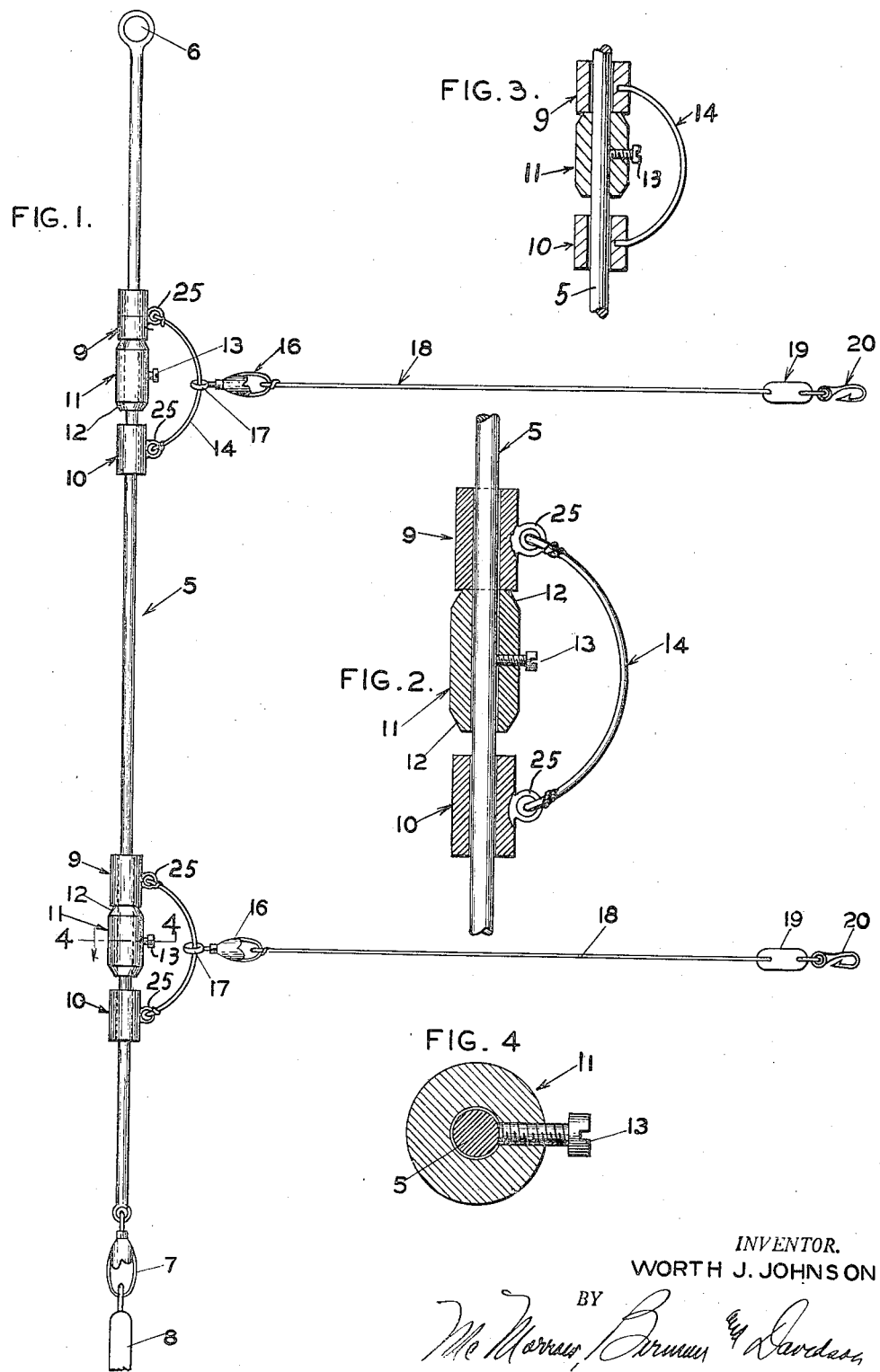
INVENTOR.
WORTH J. JOHNSON Patented Jan. 17, 1950

2,494,620

UNITED STATES PATENT OFFICE 2,494,620

FISH LURE

Worth J. Johnson, Detroit, Mich.

Application April 23, 1946, Serial No. 664,218

1 Claim. (Cl. 43—28)

My invention relates to improvements in fish lures of the type involving a relatively rigid shaft having one end attachable to a trolling line for forward movement through the water, and luring and-or hooking elements mounted at longitudinally spaced intervals along the shaft to revolve therearound, and the primary object of my invention is to provide an improved fish lure of this type in which leaders involving hooks and spinners can revolve around the shaft in laterally extended positions, so as to provide increased luring effect and hooking efficiency.

Another important object of my invention is to provide a fish lure of the character indicated above involving a simplified, more rugged means for revolubly mounting the luring and/or hooking elements on the shaft, permitting quick and easy longitudinal adjustment of said means along the shaft to vary the spacing of the said elements.

Other important objects and advantages of my invention will be apparent from the following description and the appended drawings, wherein merely for illustrative purposes, a preferred embodiment of my invention is set forth in detail.

In the drawings:

Figure 1 is a general elevational view of said embodiment showing two leads laterally extended from the shaft.

Figure 2 is an enlarged fragmentary longitudinal sectional view taken through one of the rotary members and related adjustable stop.

Figure 3 is a fragmentary longitudinal sectional view showing a modified form of the connection of the wire to the tubes carried by the shaft.

Figure 4 is an enlarged transverse sectional view taken substantially on the plane of the line 4—4 of Figure 1.

Referring in detail to the drawings, the numeral 5 generally designates the shaft of the lure which may be semirigid or rigid in character, formed at the forward end with a loop connection 6 for a fishing line (not shown) and at the rearward end with a loop having a swivel connection 7 for a suitable sinker or the like 8.

Intermediate the ends of the shaft are revolubly circumposed thereon rotary members, each consisting of two relatively heavy gauge longitudinally spaced tubes 9 and 10, whose bores fit the shaft sufficiently loosely to permit free rotation; and another relatively heavy gauge tube 11, between the tubes 9 and 10, functioning as a stop, with its ends beveled at 12 to reduce frictional contact with the tubes 9 and 10. A set screw 13 on the stop 11 permits locking it at any desired position along the shaft 5.

The tubes 9 and 10 are spaced and connected by an arcuate spring wire 14 having its opposite ends fixed to the tubes, preferably by inserting the ends of the wire in openings 15 and sweating the same therein, as shown in Figure 3. Alternately as shown in Figures 1 and 2, the ends of the spring wire 14 may be detachably secured to eyes 25 integral with the tubes 9 and 10.

The combined hook and spinner elements include a swivel 16 having a loop connection 17 freely swingable about and slidably along the arcuate wire 14, with the opposite end of the swivel connected to a leader 18 connected at its opposite end to a spinner 19, the spinner being in turn connected to a hook 20. Spring wire 14 provides a resilient connection for leader 18 by permitting limited sliding movement of tubes 9 and 10 toward each other on shaft 5 against the spring action of wire 14.

It is obvious that any suitable length shaft 5 may be employed as well as any suitable number of rotary members thereon, although only two are shown herein.

I claim:

A fish lure comprising a relatively rigid shaft adapted for connection at one end to a fishing line, at least one rotary member on said shaft, said rotary member comprising a pair of longitudinally-spaced tubes rotatably circumposed on said shaft, an arcuate spring wire having opposite ends connected to said tubes respectively, a stop disposed on said shaft intermediate said tubes and secured to said shaft for adjustment therealong, a fish lure, and means for slidably and pivotally mounting said fish lure on said arcuate wire for movement intermediate the ends thereof, at least one of said spaced tubes being normally spaced from said stop by said wire, and said wire and spaced tubes constituting a resilient connection between said lure and said shaft.

WORTH J. JOHNSON.

REFERENCES CITED

The following references are of record in the file of this patent:

UNITED STATES PATENTS

| Number | Name | Date |
|---|---|---|
| 271,424 | Comstock | Jan. 30, 1883 |
| 289,612 | Bollermann | Dec. 4, 1883 |
| 344,738 | Hollingsworth | June 29, 1886 |
| 1,303,061 | Herwig | May 6, 1919 |
| 1,314,868 | Gray | Sept. 2, 1919 |
| 1,467,116 | Reekers | Sept. 4, 1923 |
| 1,840,762 | Akervick | Jan. 12, 1932 |
| 1,870,559 | Krake | Aug. 9, 1932 |
| 2,157,819 | Eckert | May 9, 1939 |